US010778705B1

(12) United States Patent
Park et al.

(10) Patent No.: US 10,778,705 B1
(45) Date of Patent: Sep. 15, 2020

(54) DEEP-LEARNING-BASED INTRUSION DETECTION METHOD, SYSTEM AND COMPUTER PROGRAM FOR WEB APPLICATIONS

(71) Applicant: Hoseo University Academic Cooperation Foundation, Asan-si (KR)

(72) Inventors: Sung Bum Park, Yongin-si (KR); Hyun Chul Chang, Seoul (KR)

(73) Assignee: HOSEO UNIVERSITY ACADEMIC COOPERATION FOUNDATION, Asan-si (KR)

( * ) Notice: Subject to any disclaimer, the term of this patent is extended or adjusted under 35 U.S.C. 154(b) by 0 days.

(21) Appl. No.: 16/681,023

(22) Filed: Nov. 12, 2019

(30) Foreign Application Priority Data

Apr. 5, 2019 (KR) .................. 10-2019-004018 8

(51) Int. Cl.
*G06F 21/00* (2013.01)
*H04L 29/06* (2006.01)
(Continued)

(52) U.S. Cl.
CPC ........ *H04L 63/1416* (2013.01); *G06F 11/327* (2013.01); *G06K 9/6267* (2013.01); *G06N 3/0454* (2013.01)

(58) Field of Classification Search
CPC .................. H04L 63/1416; G06N 3/0454; G06K 9/6267; G06F 11/327
See application file for complete search history.

(56) References Cited

U.S. PATENT DOCUMENTS

| 10,200,382 B2* | 2/2019 | Medvedovsky .... H04L 63/1416 |
| 2019/0253442 A1* | 8/2019 | Brabec .................. G06N 20/00 |

FOREIGN PATENT DOCUMENTS

| CN | 109462582 | 3/2019 |
| KR | 20160119678 | 10/2016 |

OTHER PUBLICATIONS

Gao et al, "An Intrusion Detection Model Based on Deep Belief Networks", 2014 Second International Conference on Advanced Cloud and Big Data. (Year: 2014).*
(Continued)

*Primary Examiner* — Joseph P Hirl
*Assistant Examiner* — Ka Shan Choy
(74) *Attorney, Agent, or Firm* — Lex IP Meister, PLLC (57) ABSTRACT

The present invention relates to a deep-learning-based intrusion detection method, a system and a computer program for web applications, and more particularly, to a method, a system and a computer program for detecting whether the traffic is a hacker attack, based on an output from a deep neural network (DNN) model after setting network traffic flowing into a server farm as an input of the model. The present invention provides an effective intrusion detection system by utilizing deep neural networks in the form of complicated messages of the Web service protocol (hypertext transfer protocol (HTTP)), which is most general and representative for a company, among various application-layered services. In particular, the present invention provides a web application threat detection method, a system and a computer program implementing the same that are configured to determine security threats bypassing and intruding the detection scheme of the signature-based security system.

3 Claims, 9 Drawing Sheets

(51) Int. Cl.
*G06K 9/62* (2006.01)
*G06N 3/04* (2006.01)
*G06F 11/32* (2006.01)

(56) References Cited

OTHER PUBLICATIONS

Hyun-chul Chang, "A study on the security threat detection methodology of the web application by using deep neural network", Management of Technology, The Graduate School Hoseo University, Feb. 28, 2019.

* cited by examiner

| Model | Precision | Recall | Accuracy | F1 score |
|---|---|---|---|---|
| LSTM-RNN | 0.838 | 0.966 | 0.997 | 0.898 |
| CNN | 0.899 | 0.888 | 0.995 | 0.893 |
| C-LSTM | 0.787 | 0.793 | 0.988 | 0.790 |

[Fig. 9]

DEEP-LEARNING-BASED INTRUSION DETECTION METHOD, SYSTEM AND COMPUTER PROGRAM FOR WEB APPLICATIONS

BACKGROUND OF THE INVENTION

1. Field of the Invention

The present invention relates to a deep-learning-based intrusion detection method, system and computer program for web applications, and more particularly, to a method, a system and a computer program for detecting whether traffic is a hacker attack by inputting a network traffic flowing into a server farm to a deep neural network (DNN) model and outputting data from the model.

2. Description of the Related Art

A web application refers to a collection of software that uses the Web. In other words, the web application includes not only a web browser or web server, but also third-party applications and data used for the applications that are used to provide a service together with the web server. A web attack refers to a series of behaviors that interrupt a normal web service or leak, falsify, or misuse information by attacking the web application necessary for providing the web service.

The web service is a connectionless and open service, unlike a connection-oriented Internet service such as Telnet, Ftp and E-mail. Even web services that require user authentication through login allow any user to access a page for the login, and most web services usually have a separate service page for visitors other than members. In other words, an access management system, such as a firewall, is inadequate as a security system for protecting the web services. In addition, the web service is configured to have a hierarchical structure and be connected as a complicated system. Due to the configurations, the web attacks are different from other attacks on Internet services, and it is difficult to completely defense against the web attacks.

Many web application programs used for e-commerce purposes at companies or organizations are required to fulfill major functions, such as integrity, confidentiality and availability, on a computer security. The web application program is configured to be written in scripting languages such as PHP, ASP and JAVA embedded in HTML, be connected to a database, retrieve data thereof, and store the data in a website. In addition, all web contents are based on the retrieved data, and the database stores important user input data including personal information such as credit card numbers. Attackers look for a web service that does not have consideration on security according to various attack motivations, bypass an existing intrusion detection system by using the HTTP protocol of the web service, and attempt to manipulate, destroy or leak information in the database without access permission by using the web scripting language.

Accordingly there are increasing needs for studies on providing web services more securely, detecting attacks, which exploit the web services, and defending against the attacks. There are needs for a specialized intrusion detection system for the web services to respond quickly to various web attacks and reduce false alarms.

A signature-based analysis as one of intrusion detection techniques is a scheme of finding a specific pattern corresponding to a known attack threat, and regular expressions are used to analyze strings by comparing the strings with a signature list that is already stored. When the pattern defined by the signature is found in a payload of a packet, the strings are considered as an attack. An accurate and restrictive signature list may reduce false positives. The signature-based analysis technique may be successful when up-to-date signature patterns are maintained. However, an unknown attack such as a zero-day attack (a security attack that exploits security vulnerability before existence of the vulnerability is widely known after the vulnerability is discovered) or a latest malware cannot be detected.

PRIOR TECHNICAL DOCUMENTS

Patent Documents (Patent Document 1) KR 10-1836214 B1

SUMMARY OF THE INVENTION

In order to solve the above conventional problems, the present invention provides an effective intrusion detection system by utilizing deep neural networks in the form of complicated messages of the Web service protocol (hypertext transfer protocol (HTTP)), which is most general and representative for a company, among various application-layered services. In particular, the present invention provides a web application threat detection method, a system and a computer program implementing the same that are configured to determine security threats by bypassing and intruding the detection scheme of the signature-based security system.

To achieve the above-mentioned objectives, the deep-learning-based intrusion detection method for web applications according to the present invention includes: (a) inputting input data formed by preprocessing traffic data to a web server into a deep neural network model for intrusion detection (hereinafter referred to as "intrusion detection model"); (b) outputting, from the intrusion detection model, whether an intrusion is detected in the traffic data; and (c) generating an alarm when the intrusion is detected.

The input data generated in step (a) may be composed of a specific number of word embedding vectors.

Before step (a), the method may further include (a0) preprocessing data formed by classifying the traffic data based on an attribute (hereinafter referred to as 'attribute classification data').

Step (a0) may include (a01) merging at least one predetermined specific attribute into one field, from the attribute classification data; (a02) generating texts formed by removing special characters and stop characters to clarify word separation, from the merged data; and (a03) forming the input data by mapping (embedding) each word to a vector value, from the texts generated in step (a02).

In step (a01), the specific attribute may include information on method upon HTTP request, information on URI used in the request, and information on a browser of a client.

The vector value may be updated through weights upon learning to separate and correlate meanings between words.

The intrusion detection model may be trained by a layer arranged in the same manner as the intrusion detection model.

The intrusion detection model may include one of a convolutional neural network (CNN), a long short-term memory-recurrent neural network (LSTM-RNN), and a convolutional long short-term memory (C-LSTM).

According to another aspect of the present invention, the deep-learning-based intrusion detection system for web applications may include: at least one processor; and at least one memory configured to store a computer executable instruction, wherein the computer executable instruction stored in the at least one memory, by the at least one processor, executes (a) inputting input data formed by preprocessing traffic data to a web server into a deep neural network model for intrusion detection (hereinafter referred to as "intrusion detection model"); (b) outputting, from the intrusion detection model, whether an intrusion is detected in the traffic data; and (c) generating an alarm when the intrusion is detected.

Before step (a), the computer executable instruction may further execute (a0) preprocessing data formed by classifying the traffic data based on an attribute (hereinafter referred to as 'attribute classification data').

According to still another aspect of the present invention, the deep-learning-based intrusion detection computer program for web applications is stored in a non-transitory storage medium, and includes an instruction configured to execute, by the processor, (a) inputting input data formed by preprocessing traffic data to a web server into a deep neural network model for intrusion detection (hereinafter referred to as "intrusion detection model"); (b) outputting, from the intrusion detection model, whether an intrusion is detected in the traffic data; and (c) generating an alarm when the intrusion is detected.

Before step (a), an instruction configured to execute (a0) preprocessing data formed by classifying the traffic data based on an attribute (hereinafter referred to as 'attribute classification data') may be further included.

According to still another aspect of the present invention, the deep-learning-based intrusion detection system for web applications includes an intrusion detector including a deep neural network model for intrusion detection (hereinafter referred to as "intrusion detection model") to output whether an intrusion is detected based on the input data formed by preprocessing the traffic data to the web server; and an alarm unit configured to generate an alarm when an intrusion is detected by the intrusion detector.

The deep-learning-based intrusion detection system for web applications may further include a preprocessor configured to preprocess data formed by classifying traffic data according to an attribute (hereinafter referred to as 'attribute classification data') to form input data of the intrusion detection model.

The present invention can provide an effective intrusion detection system by utilizing deep neural networks in the form of complicated messages of the Web service protocol (hypertext transfer protocol (HTTP)), which is most general and representative for a company, among various application-layered services. In particular, the present invention can provide a web application threat detection method, a system and a computer program implementing the same that are configured to determine security threats intruding by bypassing the detection scheme of the signature-based security system.

BRIEF DESCRIPTION OF THE DRAWINGS

Hereinafter, exemplary embodiments of the present invention for achieving the effects will be described in detail with reference to the accompanying drawings.

DETAILED DESCRIPTION OF THE INVENTION

Hereinafter, preferred embodiments of the present invention will be described in detail with reference to the accompanying drawings. The terms and words used in the specification and claims of the present invention should not be construed as limited to a conventional or lexical meaning, and should be construed as the meanings and concepts consistent with the technical idea of the present invention, based on the principle that "an inventor may define the concept of the term properly in order to describe the invention in the best way". Accordingly, the embodiments described herein and the configurations shown in the drawings are merely preferred embodiments according to the present invention, and do not represent all of the technical ideas of the present invention. Therefore, it should be understood that various equivalents and modifications may be substituted therefor at the time of filing of the present application.

Figure 1:
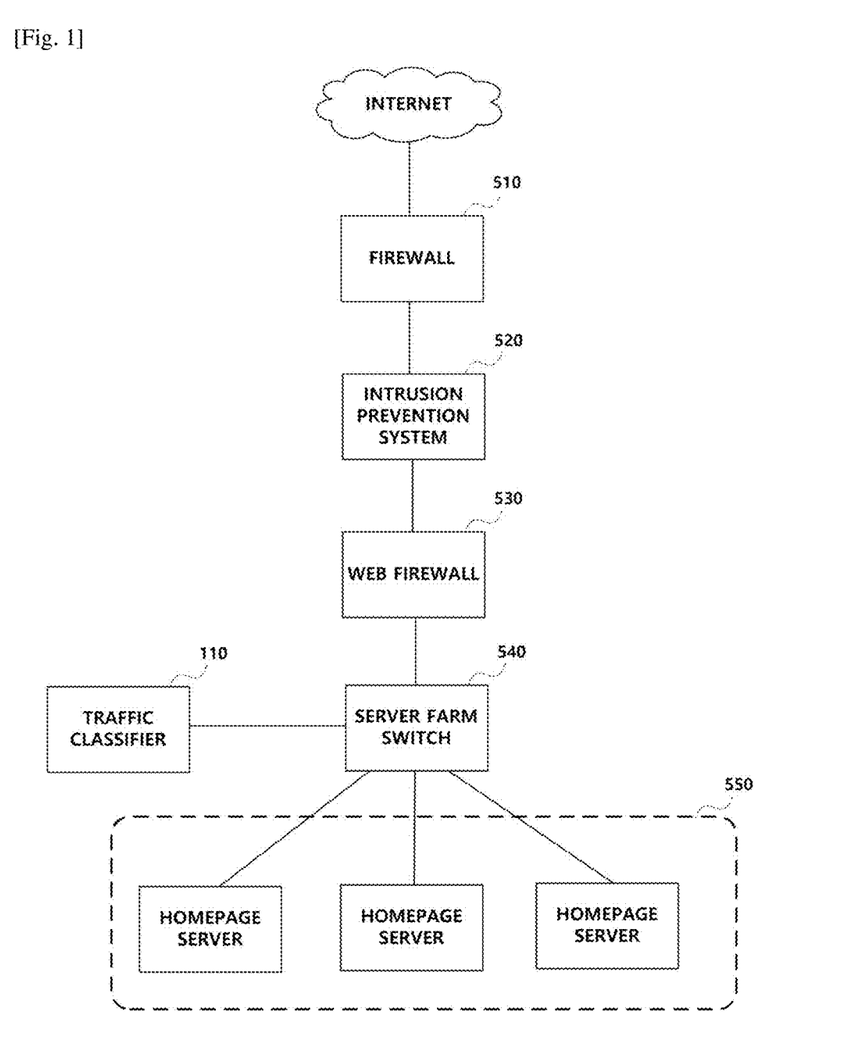
FIG. 1 is a conceptual diagram illustrating a network for constructing a data set of a deep-learning-based intrusion detection model for web applications according to the present invention.

FIG. 1 is a conceptual diagram showing a network for constructing a data set of a deep-learning-based intrusion detection model for web applications according to the present invention.

Intrusion analysis schemes may be mainly classified into a signature-based analysis, an abnormally-based analysis, and a stateful protocol analysis.

Signature-Based Analysis

The signature-based analysis may be a very simple detection scheme that finds a specific pattern corresponding to a known attack threat. The above scheme analyzes strings by comparing the strings with a saved signature list by using regular expressions. When a pattern defined by the signature is confirmed in a payload of a packet, the strings are considered as an attack. An accurate and restrictive signature list may reduce false positives. The signature-based analysis technique may be successful when up-to-date signature patterns are maintained. However, an unknown attack such as a zero-day attack or a latest malware cannot be detected.

Anomaly-Based Analysis

The anomaly-based analysis is based on defining network behavior. The network behavior is based on a predefined behavior and generates an event when an abnormality is detected. An important factor in defining the network behavior is an engine performance of the intrusion detection system to handle the intrusion during all protocol levels. According to the anomaly-based analysis technique although the computational cost increases upon analyzing the protocol, the false positives may be reduced by increasing a detection rule set. The major disadvantage is a definition of the detection rule set. The performance of the anomaly-based detection system depends on how successfully the system is executed and tested over all protocols. The process of defining the rule is influenced by various protocols generated by various vendors. In addition, it is also difficult for a user to define the protocols. For a proper detection, it is necessary to develop the protocols by an administrator having detailed knowledge on network behaviors. Compared with the signature-based analysis, the anomaly-based analysis has a major advantage in that an attack, which is not defined by the signature, also may be detected by analyzing a behavior deviated from normal traffic patterns. Accordingly, attack types such as new worms may be detected.

Stateful Protocol Analysis

The stateful protocol analysis, which is also called deep packet inspection (DPI) in networks, performs a process of comparing profiles that define generally normal protocol behaviors in each protocol state. The stateful protocol analysis may identify an unexpected instruction system, such as entering the same instruction repeatedly, and track an action of an authority or record a suspicious behavior, through each session. The above analysis technique is useful for investigating events. Whereas the anomaly-based analysis adopts a profile specified to a predefined network or host, the stateful protocol analysis analyzes a specific protocol through a vendor-developed profile.

In order to understand the goal of the research for the present application, the network conceptual diagram of FIG. 1 generalizes a security environment basically established in most companies or organizations.

The first stage is to pass a firewall 510 in order to use a homepage of the organization through the Internet. The firewall serves as a basic access control for IP, which is a third layer of OSI 7 Layer, and a transfer protocol (such as TCP and UDP), which is a fourth layer, and also serves to partially defense against DDoS attacks causing excessive accesses to a homepage server. A second sensor for the traffic having passed the firewall occurs in an intrusion prevention system (IPS) 520. The IPS 520 serves to detect and block intrusion threats, such as inflow of viruses or malicious codes, abnormal protocols, and DDoS attacks, based on predefined detection rules for the homepage of the organization. The traffic having passing the IPS passes through a web firewall 530 dedicated to defend against threats on web services. The web firewall 530 detects and blocks various homepage threats including threats defined by OWASP, for the web services operated by the organization.

Although manufacturers may use some techniques for the security system, the typical signature-based intrusion detection policy is basically used.

The present invention is directed to effectively detect intrusion threats, which are not detected by various security systems that are used currently and generally, through deep neural network techniques Hereinafter, a method of performing the deep learning-based intrusion detection method of the present invention will be described with reference to FIG. 2.

Figure 2:
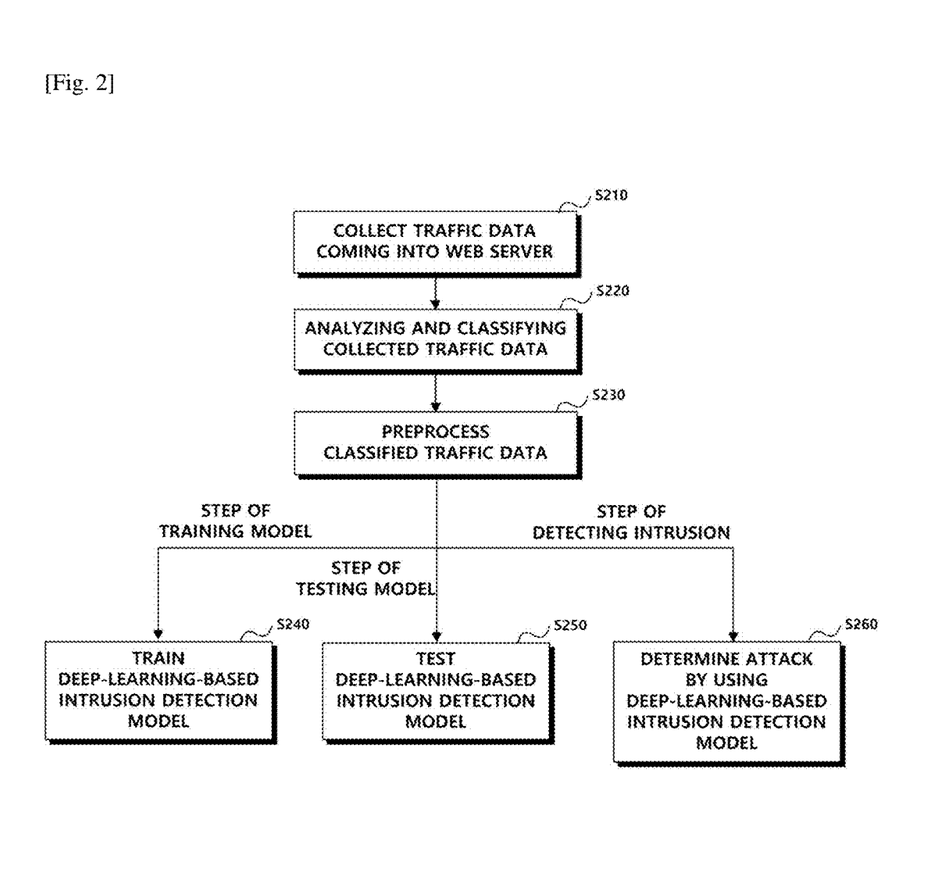
FIG. 2 is a flowchart to perform a deep-learning-based intrusion detection method for web applications according to the present invention.
Figure 3A:
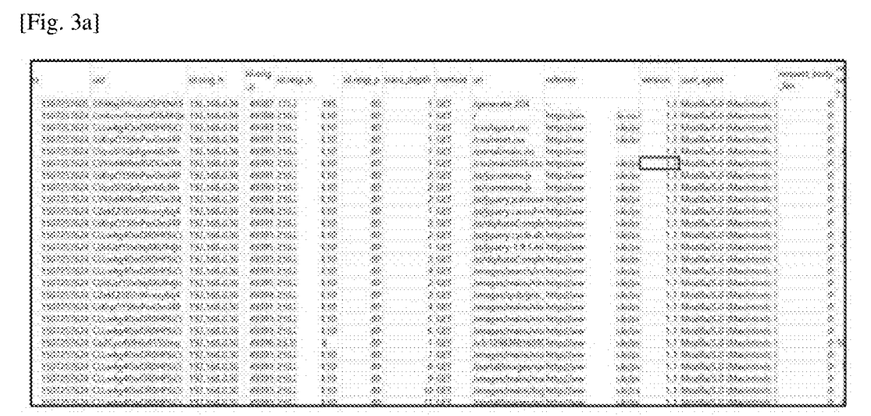
FIGS. 3a and 3b are views illustrating one embodiment of data (FIG. 3a) formed by classifying traffic data according to an attribute, and preprocessed learning data (FIG. 3b).
Figure 3B:
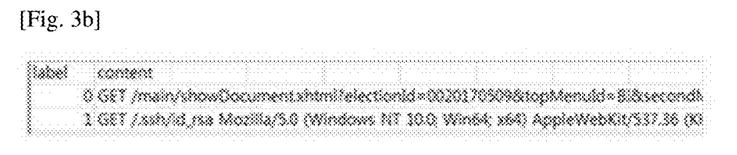

FIG. 2 is a flowchart to perform the deep-learning-based intrusion detection method for web applications. FIGS. 3a and 3b are views showing one embodiment of data (FIG. 3a) formed by classifying traffic data according to an attribute, and preprocessed learning data (FIG. 3b).

First, traffic data flowing into a server farm 550 is collected (S210). In order to establish data for analysis, it is required to collect all traffic flowing into the web server (home page server) through the security system. Accordingly, for effective analysis, all traffic flowing into the homepage server are collected by copying the traffic to a traffic classifying unit 110 (see FIGS. 1 and 4) for additionally collecting and analyzing the traffic by using a traffic mirroring technique at a network switch 540 (see FIG. 1) for the server farm 550 (see FIG. 1) composed of web servers.

Then, the collected traffic data is analyzed and classified (S220). As one embodiment for the traffic analysis and classification for intrusion threat detection, 'Bro', which is a unix-based network traffic monitoring open source, may be used. A license policy of Bro is more flexible and has no limitation compared to that of Snort which is an open source platform and traditionally used in security systems. Whereas the signature-based snort discards a packet that does not correspond to a signature engine, Bro stores and analyzes all traffic, so Bro is superior to analysis on anomaly behaviors. In addition, when a separate programming language provided by Bro is used a delicate traffic classification may be easily performed as a developer intends. The above feature is optimized for an artificial intelligence-based intrusion detection utilizing the deep neural network (DNN). Forty attributes of web service traffic indicated in Bro are shown in Table 1.

TABLE 1

| No. | attribute value | meaning | indicated value (example) |
|---|---|---|---|
| 1 | ts | request occurring point (time) | 1507257604.88963 |
| 2 | uid | connection eigenvalue (ID) | CR4Kaj3HVuUOSPEN |
| 3 | orig_h | source IP address | 192.168.0.30 |
| 4 | orig_p | source tcp port address | 48477 |
| 5 | rsp_h | destination IP address | 11.1.1.3 |
| 6 | resp_p | destination tcp port address | 80 |

TABLE 1-continued

| No. | attribute value | meaning | indicated value (example) |
|---|---|---|---|
| 7 | trans_depth | depth of connection information upon request/response (indicated with a pipeline) | integer (1, 3, 15, and so on) |
| 8 | Method | information (Method) upon HTTP request | GET, POST, HEAD, etc |
| 9 | Host | URL information | www.bro.org |
| 10 | Uri | URI used in the request | /board/index.html |
| 11 | referrer | reference header value | www.naver.com |
| 12 | version | HTTP version information | 1.1 |
| 13 | user_agent | client browser information | Mozilla/5.0 |
| 14 | request_body_len | size of uncompressed data transferred from client | integer (default value = 0) |
| 15 | response_body_len | Size of uncompressed data transferred from server | integer (default value = 0) |
| 16 | status_code | response value from server | 200, 404, 300, etc |
| 17 | status_msg | type of message responded by server | OK, Moved Temporary, no Content, etc |
| 18 | info_code | response codes of 100s responded by server | 101 |
| 19 | info_msg | response messages numbered of 100s and responded by server | 101 |
| 20 | tags | attribute index set related to specific request/response pair | Http::URI_SQLI |
| 21 | username | user account information on request | root |
| 22 | password | user password on request | password |
| 23 | capture_password | to determine whether to capture password that appears on request | |
| 24 | proxied | all header information indicating whether the request is proxied | |
| 25 | range_request | to indicate whether the request can take 206 content in response | default = F |
| 26 | orig_fuids | all header information indicating whether the request is proxied | |
| 27 | orig_file names | sequencing vector of file names of clients | |
| 28 | orig_mime_types | sequencing vector of mime types | |
| 29 | resp_fuids | sorted vector of unique IDs of files | |
| 30 | resp_file names | sequencing vector of file names of server | |
| 31 | resp_mime_types | sequencing vector of mime types | |
| 32 | current_entity | current entity | |
| 33 | orig_mime_depth | the number of current MIME entities in body of HTTP request message | |
| 34 | resp_mime_depth | the number of current MIME entities in body of HTTP response message | |
| 35 | client_header_names | vector of HTTP header name sent by client | |
| 36 | server_header_names | vector of HTTP header name sent by server | |
| 37 | omniture | whether server serves as an advertisement server | |
| 38 | flash_version | unanalyzed flash version | |
| 39 | cookie_vars | all variable names extracted from all cookie values | |
| 40 | uri_vars | various variables indicated in URI | |

FIG. 3a shows a partial excerpt of information on the web service traffic classified according to the attributes of Table 1 through Bro. All attributes related to the web service and including message contents of HTTP request and response packets sent through Bro are distinguished and additional information, such as uniqueness (session) between the web client and the server and time, is indicated.

Attributes 1 to 6 include connection information including a time stamp, a user connection identifier (uid), and IP address and TCP port of a source and a destination. The uid, which is one of the important attributes, may have a 4-tuple (origin_host, origin_port, response_host, and response_port) that is a connection information given during connection lifetime, and may be associated with other service traffic information (such as Telnet, Ftp, and E-mail) classified by Bro to identify an activity history. In other words, the activity history that occurs based on the uid is shown in detail from attribute 7.

Web services use various scripting languages. In addition, the scripting languages are connected with a database, and users may access the database and retrieve, store or modify information through the scripting languages. Many web service hacking incidents are caused by vulnerabilities in the script configuration, because the script has an unstructured syntax structure that is hardly detected by the signature-based security system using the predefined rules. In general, when the web service is used, request values (strings) transferred from the client (browser) to the server correspond mainly to attributes 8, 10 and 13. The present invention focuses on a method of detecting intrusion threats for the above three attributes that are difficult to detect in the existing intrusion detection systems.

After the traffic data is classified, the classified traffic data is preprocessed (S230). A first step of the data preprocessing is a data rearrangement step of reducing the number of unnecessary attributes out of the forty web service attributes classified by the traffic classifier to seventeen attributes. Table 2 shows the primarily reduced seventeen attributes. Attributes 14 to 17, which are additional attributes that provide status information such as a data size and a message during the transmission and reception between the client and the web server, may enable a detailed traffic analysis when needed although the attributes are not directly related to the intrusion detection.

TABLE 2

| attribute No. | value | meaning | indicated value (example) |
|---|---|---|---|
| 1 | ts | request occurring point (time) | 1507257604.88963 |
| 2 | uid | connection eigenvalue (ID) | CR4Kaj3HVuUOSPEN |
| 3 | orig_h | source IP address | 192.168.0.30 |
| 4 | orig_p | source tcp port address | 48477 |
| 5 | rsp_h | destination IP address | 11.1.1.3 |
| 6 | resp_p | destination tcp port address | 80 |
| 7 | trans_depth | depth of connection information upon request/response (indicated with a pipeline) | integer (1, 3, 15, and so on) |
| 8 | Method | information (Method) upon HTTP request | GET, POST, HEAD, etc. |
| 9 | host | URL information | www.bro.org |
| 10 | uri | URI used in the request. | /board/index.html |
| 11 | referrer | reference header value | www.naver.com |
| 12 | version | HTTP version information | 1.1 |
| 13 | useragent | client browser information | Mozilla/5.0 |

TABLE 2-continued

| attribute No. | value | meaning | indicated value (example) |
|---|---|---|---|
| 14 | request_body_len | size of uncompressed data transferred from client | integer (default value = 0) |
| 15 | response_body_len | Size of uncompressed data transferred from server | integer (default value = 0) |
| 16 | status_code | response value from server | 200, 404, 300, etc |
| 17 | status_msg | type of message responded by server | OK, Moved Temporary, no Content, etc |

However, since the present invention is provided to improve intrusion detection performance in HTTP raw log, only attributes 8, 10 and 13 that contain important information are used instead of using all seventeen attributes in Table 2.

Attributes 8, 10 and 13 have time series characteristics in an aspect of the HTTP protocol structure and have deep correlations between the attributes. Accordingly, the attributes separated in three fields are merged into one field to form a continuous sentence structure. Then, a label field is added to distinguish between normal and abnormal. As shown in FIG. 3b, '0' denotes a normal and '1' denotes an attack in a label attribute. A content property is the merging of the three attributes 8, 10 and 13 described above.

A second step in the data preprocessing is to clarify the classification of words by removing special characters and stop characters and then convert each word composed of texts into a numeric-format vector value by using an embedding technique so as to apply the words as an input to deep neural network models used for the analysis. In order to embed the words as the vector value, the word vector may be updated during training the model after the word vector is randomly initialized.

In other words, after some of the raw data flowing into the homepage server farm are randomly selected to construct a data set, the data set is divided into a data set for model training and a data set for testing. First, in order to train the deep-learning-based intrusion detection model, the training is performed by inputting the data set into the model (S240). One of a convolutional neural network (CNN), a long short-term memory-recurrent neural network (LSTM-RNN), and a convolutional long short-term memory (C-LSTM) may be used for a structure of the deep-learning-based intrusion detection model. Each structure will be briefly described later with reference to FIGS. 5 to 7.

After the model is formed, for the testing, a test is performed by inputting the preprocessed data set to the model (S250). After the model is confirmed through the testing the preprocessed actual traffic data set is inputted to the model to determine whether the traffic data is attacked (S260).

Figure 4:
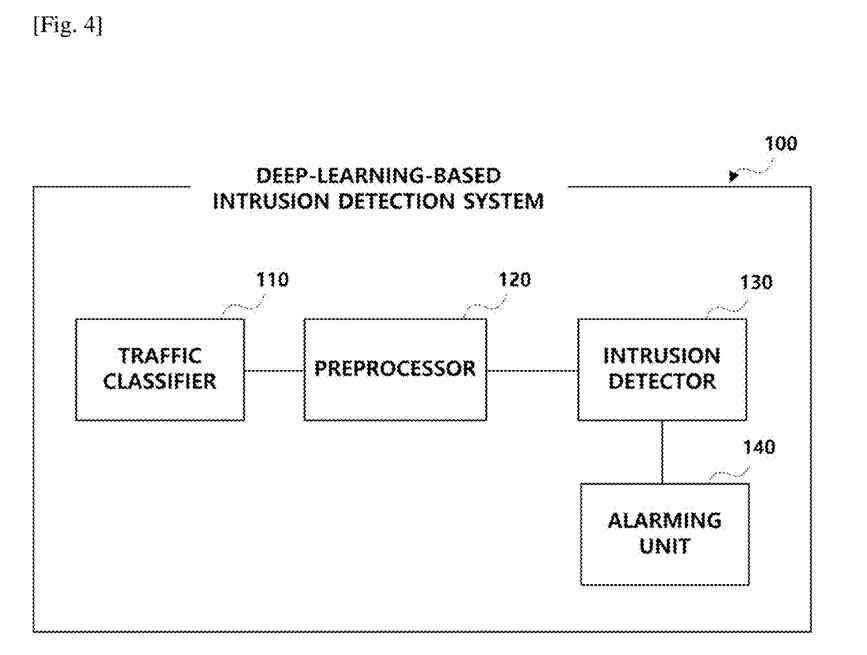
FIG. 4 is a view illustrating a configuration of a deep-learning-based intrusion detection system for web applications according to the present invention.

FIG. 4 is a view showing a configuration of a deep-learning-based intrusion detection system 100 for web applications.

The deep-learning-based intrusion detection system 100 for web applications according to the present invention may be divided into a traffic classifier 110, a preprocessor 120, and an intrusion detector 130.

The traffic classifier 110 uses an open source-based Bro platform developed for intrusion detection. Bro serves to collect all real-time traffic of a subject to be protected, remove unnecessary information, and classify the traffic according to each service protocol.

The preprocessor 120 processes the data resulted from the traffic classifier 110 by correcting, deleting, or adding the data, and then extracts security threat information and construct a data set to apply the data set as an artificial intelligence input. The above preprocessing has been described in detail with reference to FIG. 2.

The intrusion detector 130 trains the artificial intelligence using the artificial intelligence technique (such as machine learning or deep neural network) suitable for application characteristics to detect a data set defined according to each attack type, thereby serving to generate a security alarm when an intrusion attempt is detected. In other words, the intrusion detection model as described above is mounted on the intrusion detector, and the deep-learning-based intrusion detection model may have one structure among a convolutional neural network (CNN), a long short-term memory-recurrent neural network (LSTM-RNN), and a convolutional long short-term memory (C-LSTM). Hereinafter, the structure will be described with reference to FIGS. 5 to 7.

Figure 5:
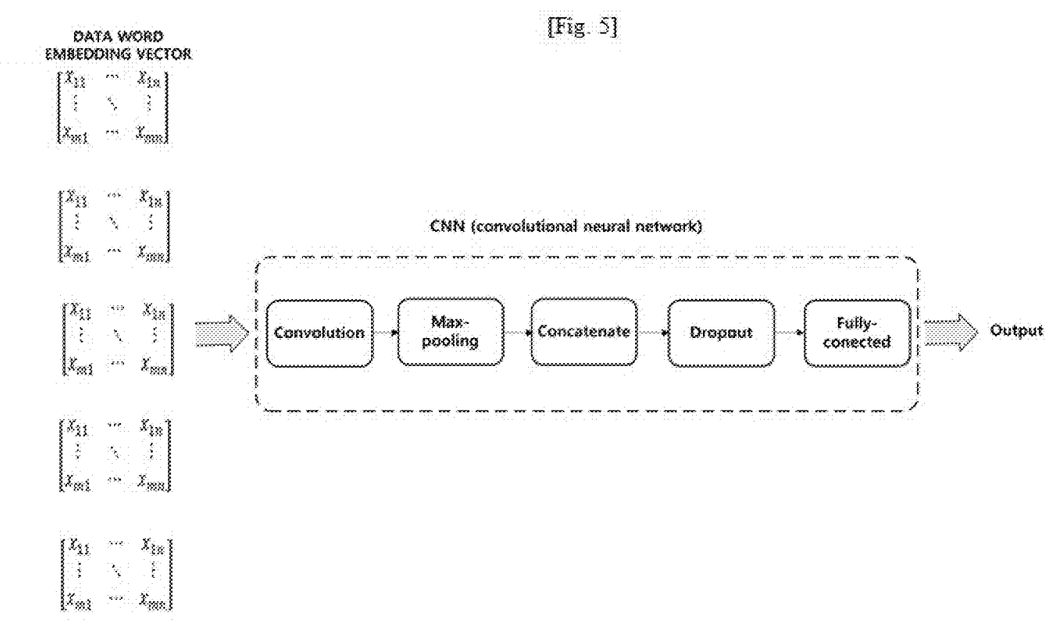
FIG. 5 is a view illustrating a configuration of a convolutional neural network (CNN) as one embodiment of the deep-learning-based intrusion detection system for web applications according to the present invention.
Figure 6:
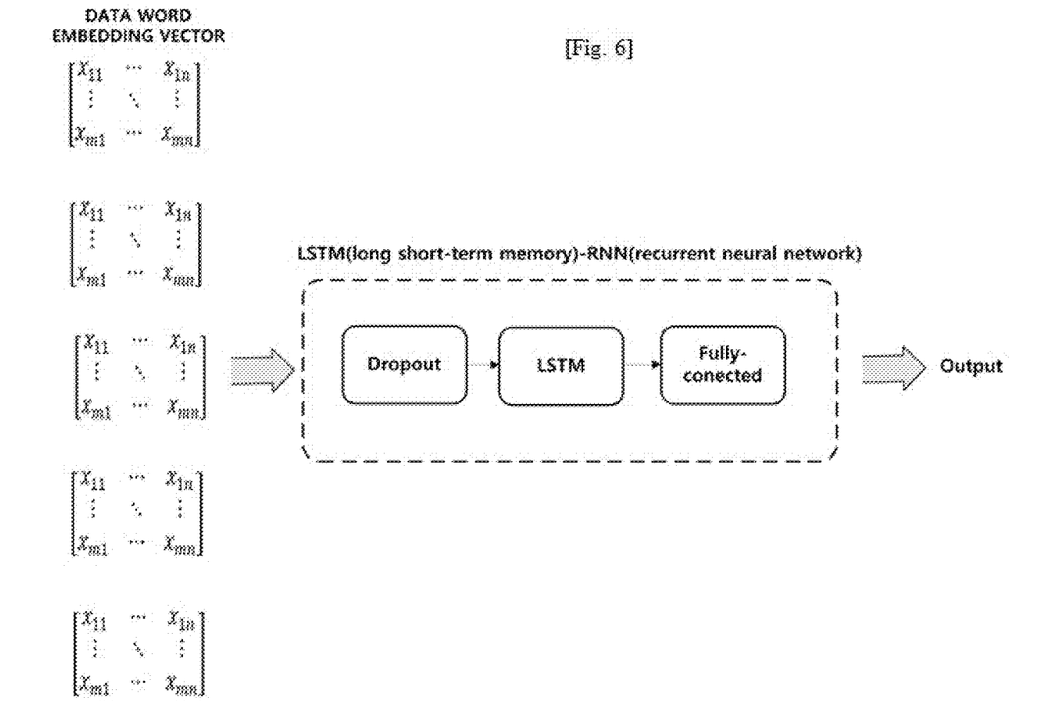
FIG. 6 is a view illustrating a configuration of a long short-term memory-recurrent neural network (LSTM-RNN) as another embodiment of the deep-learning-based intrusion detection system for web applications according to the present invention.
Figure 7:
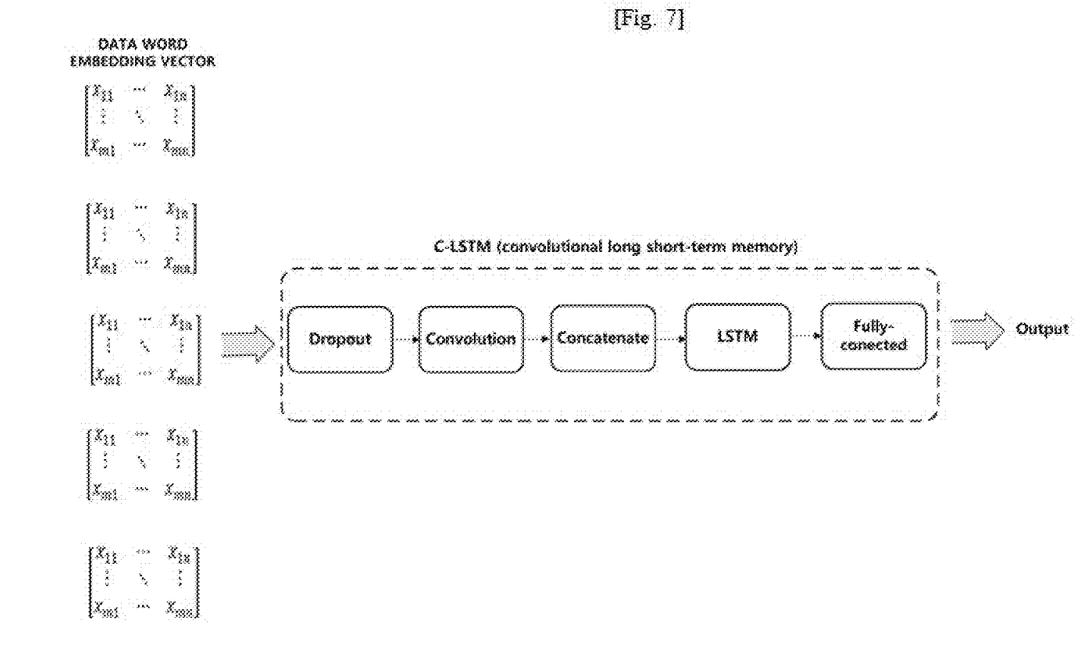
FIG. 7 is a view illustrating a configuration of a convolutional long short-term memory (C-LSTM) as another embodiment of the deep-learning-based intrusion detection system for web applications according to the present invention.

FIG. 5 is a view showing a configuration of the convolutional neural network (CNN) as one embodiment of the deep-learning-based intrusion detection system for web applications according to the present invention. FIG. 6 is a view showing a configuration of the long short-term memory-recurrent neural network (LSTM-RNN) as another embodiment of the deep-learning-based intrusion detection system for web applications according to the present invention. FIG. 7 is a view showing a configuration of the convolutional long short-term memory (C-LSTM) as another embodiment of the deep-learning-based intrusion detection system for web applications according to the present invention.

First, in each structure, a lookup table is configured by extracting and indexing words from the content attribute of the data set through a word embedding. The embedding refers to map a word to a vector value in a particular dimension, and the converted vector value is updated through weights (w) upon training to distinguish relations of meanings between words.

In one embodiment, a convolution layer used in the CNN and the C-LSTM may use three filters having sizes of 3, 4 and 5, and the number of filters is 128. The filter may extract local information as the filter slides by one space (stride=1), and feature maps at the number of the filters may be generated by filtering features at the same number of the filters.

Whereas the CNN model performs a max-pooling process after generating the feature maps, the C-LSTM model omits the max-pooling process. When the max-pooling process is performed, each feature map takes a maximum value and samples the input values so that the mapping may be performed as an output in fixed dimensions and the dimensions may be reduced. However, in the C-LSTM, the information extracted from the feature map is concatenated without fixing or reducing the dimensions, and then the output value is used as an input for a next LSTM.

An LSTM cell may include two LSTM cells and each of the LSTM cell has 128 hidden units. Finally, the value outputted from the LSTM may pass through a fully-connected layer and a score corresponding to each class (0 and 1) is calculated, so that the intrusion detection classification is performed. Then, an error reverse propagation of the result is performed to execute a general process of updating parameters such as weights. Table 3 summarizes hyper-parameters as one embodiment of the above-described intrusion detection model.

TABLE 3

| Model | Embedding size | Size of filter | The number of filters | Conv. layer | LSTM Cell | Hidden unit | Dropout | Learning rate | Active function |
|---|---|---|---|---|---|---|---|---|---|
| CNN | 256 | 3,4,5 | 128 | 1 | — | — | 50% | 0.001 | ReLU, Softmax |
| LSTM-RNN | 256 | — | — | — | 2 | 128 | 50% | 0.001 | Tanh, sigmoid, Softmax |
| C-LSTM | 256 | 3,4,5 | 128 | 1 | 2 | 128 | 50% | 0.001 | ReLU sigmoid Softmax |

Figure 8:
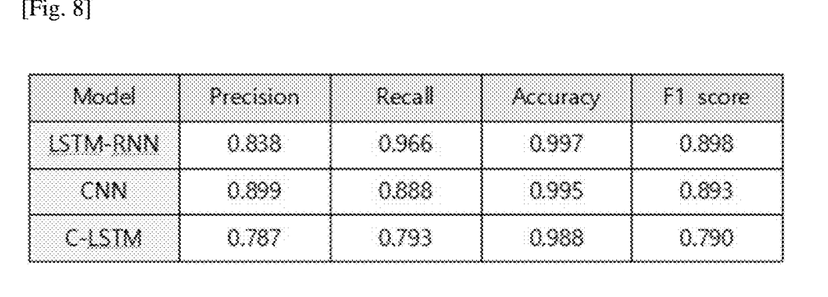
FIG. 8 is a view illustrating a result table of intrusion detection performance of the deep-learning-based intrusion detection model for web applications according to the present invention.
Figure 9:
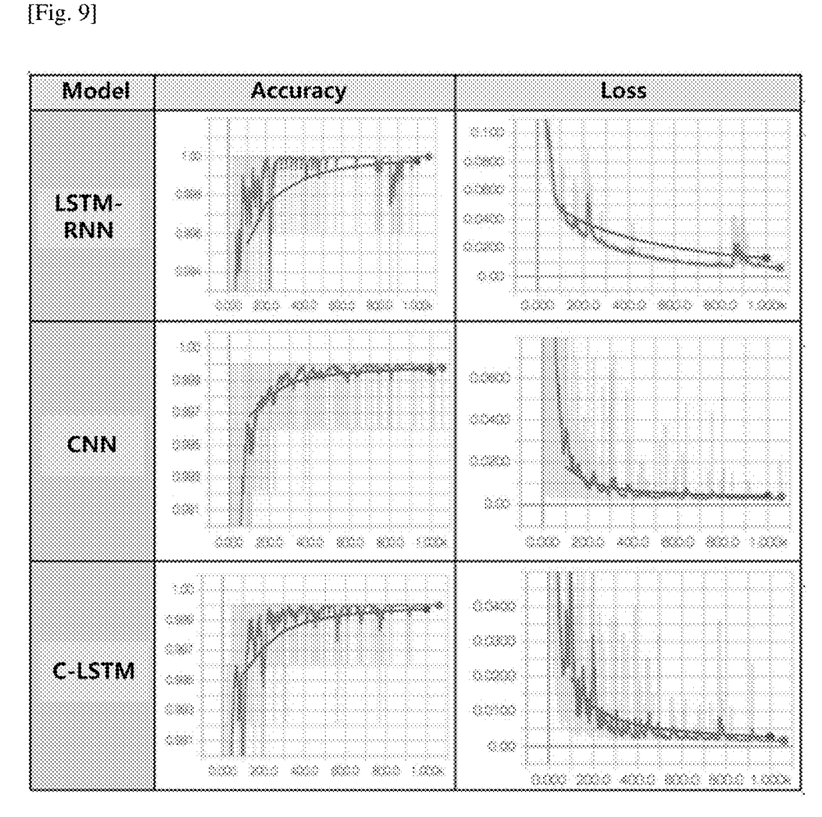
FIG. 9 is a view illustrating an ROC curve indicating an accuracy and a loss for each step with respect to each model.

FIG. 8 is a view showing a result table of intrusion detection performance of the deep-learning-based intrusion detection model for web applications according to the present invention. FIG. 9 is a view showing an ROC curve indicating an accuracy and a loss for each step with respect to each model.

According to the present invention, the result may be binarily classified into a normal with '0' and an attack with '1'. Accordingly, the classification of result into any one of '0' or '1' may be predicted based on a confusion matrix of Table 4.

TABLE 4

| | | Predicted | |
|---|---|---|---|
| Item | | Negative Class (normal) | Positive Class (attack) |
| Observed | Negative Class (normal) | TN (True Negative) | FP (False Positive) |
| | Positive Class (attack) | FN (False Negative) | TP (True Positive) |

In Table 4, the true positive (TP) denotes a measure value of the number of classification in which a plurality of attack events are classified as actual attacks, the false negative (FN) denotes a measure value of the number of classification in which a plurality of normal events are wrongly classified as attacks, the false positive (FP) denotes a measure value of the number of classification in which a plurality of attack events are classified as normal events, and the true negative (TN) denotes a measure value of the number of classification in which a plurality of normal events are classified as actual normal events.

TABLE 5

| Metric | formula |
| --- | --- |
| Precision | TP/(TP + FP) |
| Recall, Detection Rate | TP/(TP + FN) |
| Accuracy | (TP + TN)/(TN + TP + FN + FP) |
| F1 score | (2 * Precision * Recall)/(precision + recall) |

Table 5 shows a basic evaluation index for calculating the intrusion detection performance based on the confusion matrix.

The precision refers to the percentage of data that is actually an attack out of the number of attacks detected by an algorithm. Whereas, the recall signifies that how successfully data to be detected is found out, and the recall may also be called a sensitivity or a detection rate. The very high probability of belonging to a corresponding class may be predicted to increase better precision, but the recall becomes low. This is because there are lots of data that actually belong to the class but are excluded due to the low probability. F1 score considers both precision and recall. The F1 score refers to a harmonic average between the precision and the recall and is useful for measuring machine learning-based intrusion detection performance.

FIG. 8 shows the analysis result value obtained by setting 256 input records as to be learned at a time (batch size=256) for total data records of 14,215. The above process is repeated 20 times (epoch=20) and the result value for each step is averaged (the total number of steps=989).

As shown in the results, the LSTM-RNN model has the recall of 0.966, the accuracy of 0.997, and the F1 score of 0.898, and indicates that overall performance is excellent compared to other models. In an aspect of precision, the CNN model has an excellent performance of 0.899. Whereas, the overall performance of the C-LSTM model is indicated as low in the recall, accuracy and precision compared to other models. As described above, FIG. 9 is a view showing an ROC curve indicating an accuracy and a loss for each step with respect to each model.

What is claimed is:

1. A deep-learning-based intrusion detection method for web applications, the deep-learning-based intrusion detection method comprising:
    (a0) preprocessing data formed by classifying traffic data based on an attribute (hereinafter referred to as 'attribute classification data');
    (a) inputting input data formed by preprocessing the traffic data to a web server into a deep neural network model for intrusion detection (hereinafter referred to as "intrusion detection model");
    (b) outputting, from the intrusion detection model, whether an intrusion is detected in the traffic data; and
    (c) generating an alarm when the intrusion is detected,
    wherein the input data generated in step (a) is composed of a specific number of word embedding vectors,
    wherein step (a0) includes:
    (a01) merging at least one predetermined specific attribute into one field, from the attribute classification data:
    (a011) after the step (a01), adding a label field to distinguish between normal and abnormal;
    (a02) generating texts formed by removing special characters and stop characters to clarify word separation, from the merged data; and
    (a03) forming the input data by mapping (embedding) each word to a vector value, from the texts generated in step (a02),
    wherein the specific attributes, which have time series characteristics in an aspect of the HTTP protocol structure and have deep correlations therebetween, in step (a01) exclusively include information on method upon HTTP request, information on URI used in the request, and information on a browser of a client,
    wherein, in the step (a03), word vector is updated during training the model after the word vector is randomly initialized in order to embed the words as the vector value,
    wherein the vector value is updated through weights upon learning so as to separate and correlate meanings between words,
    wherein the intrusion detection model is trained by a layer arranged equal to the intrusion detection model, and,
    wherein the intrusion detection model includes one of a convolutional neural network (CNN), a long short-term memory-recurrent neural network (LSTM-RNN), and a convolutional long short-term memory (C-LSTM).

2. A deep-learning-based intrusion detection system for web applications, the deep-learning-based intrusion detection system comprising:
    at least one processor; and
    at least one memory configured to store a computer executable instruction, wherein
    the computer executable instruction stored in the at least one memory executes:
    (a0) preprocessing data formed by classifying traffic data based on an attribute (hereinafter referred to as 'attribute classification data');
    (a) inputting input data formed by preprocessing the traffic data to a web server into a deep neural network model for intrusion detection (hereinafter referred to as "intrusion detection model");
    (b) outputting, from the intrusion detection model, whether an intrusion is detected in the traffic data; and
    (c) generating an alarm when the intrusion is detected, by the at least one processor,
    wherein the input data generated in step (a) is composed of a specific number of word embedding vectors,
    wherein step (a0) includes:
    (a01) merging at least one predetermined specific attribute into one field, from the attribute classification data;
    (a011) after the step (a01), adding a label field to distinguish between normal and abnormal;
    (a02) generating texts formed by removing special characters and stop characters to clarify word separation, from the merged data; and
    (a03) forming the input data by mapping (embedding) each word to a vector value, from the texts generated in step (a02),
    wherein the specific attributes, which have time series characteristics in an aspect of the HTTP protocol structure and have deep correlations therebetween, in step (a01) exclusively include information on method upon HTTP request, information on URI used in the request, and information on a browser of a client,
    wherein, in the step (a03), word vector is updated during training the model after the word vector is randomly initialized in order to embed the words as the vector value,
    wherein the vector value is updated through weights upon learning so as to separate and correlate meanings between words,
    wherein the intrusion detection model is trained by a layer arranged equal to the intrusion detection model, and, wherein the intrusion detection model includes one of a convolutional neural network (CNN), a long short-term memory-recurrent neural network (LSTM-RNN), and a convolutional long short-term memory (C-LSTM).

3. A deep-learning-based intrusion detection computer program for web applications, wherein the computer program is stored in a non-transitory storage medium and comprises an instruction to execute, by the processor:
- (a0) preprocessing data formed by classifying traffic data based on an attribute (hereinafter referred to as 'attribute classification data');
- (a) inputting input data formed by preprocessing the traffic data to a web server into a deep neural network model for intrusion detection (hereinafter referred to as "intrusion detection model");
- (b) outputting, from the intrusion detection model, whether an intrusion is detected in the traffic data; and
- (c) generating an alarm when the intrusion is detected, wherein the input data generated in step (a) is composed of a specific number of word embedding vectors, wherein step (a0) includes:
- (a01) merging at least one predetermined specific attribute into one field, from the attribute classification data;
- (a011) after the step (a01), adding a label field to distinguish between normal and abnormal;
- (a02) generating texts formed by removing special characters and stop characters to clarify word separation, from the merged data; and
- (a03) forming the input data by mapping (embedding) each word to a vector value, from the texts generated in step (a02), wherein the specific attributes, which have time series characteristics in an aspect of the HTTP protocol structure and have deep correlations therebetween, in step (a01) exclusively include information on method upon HTTP request, information on URI used in the request, and information on a browser of a client, wherein, in the step (a03), word vector is updated during training the model after the word vector is randomly initialized in order to embed the words as the vector value, wherein the vector value is updated through weights upon learning so as to separate and correlate meanings between words, wherein the intrusion detection model is trained by a layer arranged equal to the intrusion detection model, and, wherein the intrusion detection model includes one of a convolutional neural network (CNN), a long short-term memory-recurrent neural network (LSTM-RNN), and a convolutional long short-term memory (C-LSTM).

* * * * *